(12) United States Patent
Lee et al.

(10) Patent No.: US 10,936,106 B2
(45) Date of Patent: Mar. 2, 2021

(54) DISPLAY DEVICE WITH TOUCH SENSOR AND DISPLAY SENSOR IN SAME LAYER

(71) Applicant: Samsung Display Co., Ltd., Yongin-si (KR)

(72) Inventors: Kang Won Lee, Yongin-si (KR); Sang Chul Lee, Yongin-si (KR); Seung Hwan Chung, Yongin-si (KR); Young Sik Kim, Yongin-si (KR); Choon Hyop Lee, Yongin-si (KR); Yeon Sung Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 28 days.

(21) Appl. No.: 16/361,153

(22) Filed: Mar. 21, 2019

(65) Prior Publication Data
US 2019/0332218 A1 Oct. 31, 2019

(30) Foreign Application Priority Data
Apr. 25, 2018 (KR) .......................... 10-2018-0047956

(51) Int. Cl.
*G06F 3/041* (2006.01)

(52) U.S. Cl.
CPC .......... *G06F 3/0414* (2013.01); *G06F 3/0412* (2013.01); *G06F 3/0416* (2013.01); *G06F 2203/04102* (2013.01); *G06F 2203/04105* (2013.01); *G06F 2203/04106* (2013.01)

(58) Field of Classification Search
CPC . G06F 2203/04102; G06F 2203/04105; G06F 2203/04106; G06F 3/0412; G06F 3/0414; G06F 3/0416
See application file for complete search history.

(56) References Cited

U.S. PATENT DOCUMENTS

| | | |
|---|---|---|
| 9,116,570 B2 | 8/2015 | Lee et al. |
| 9,128,569 B2 | 9/2015 | Kang et al. |
| 9,304,348 B2 | 4/2016 | Jang |
| 2011/0290038 A1* | 12/2011 | Hoshino .................. G01L 1/20 73/862.627 |
| 2017/0003811 A1 | 1/2017 | Lu |
| 2017/0300736 A1 | 10/2017 | Song et al. |
| 2018/0232092 A1* | 8/2018 | Lee ......................... G06F 21/32 |
| 2018/0335883 A1* | 11/2018 | Choi ..................... G06F 3/0414 |

FOREIGN PATENT DOCUMENTS

| | | |
|---|---|---|
| KR | 10-1381817 | 4/2014 |
| KR | 10-2017-0040408 | 4/2017 |

* cited by examiner

*Primary Examiner* — Chun-Nan Lin
(74) *Attorney, Agent, or Firm* — H.C. Park & Associates, PLC

(57) ABSTRACT

A display device includes: a display panel including a display area in which an image is displayed and a non-display area surrounding the display area; an input sensor disposed on the display panel; and a pressure sensor sensing a pressure, wherein the input sensor includes a sensing base substrate extending in a first extending direction, the sensing base substrate including a first bending area bent along an outer edge of the sensing base substrate, wherein the pressure sensor is disposed on the first bending area of the sensing base substrate, and overlaps with the display area.

23 Claims, 13 Drawing Sheets

DISPLAY DEVICE WITH TOUCH SENSOR AND DISPLAY SENSOR IN SAME LAYER

CROSS REFERENCE TO RELATED APPLICATION

This application claims priority from and the benefit of Korean Patent Application No. 10-2018-0047956, filed on Apr. 25, 2018, which is hereby incorporated by reference for all purposes as if fully set forth herein.

BACKGROUND

Field

Exemplary embodiments of the invention generally relate to a display device.

Discussion of the Background

With the development of information technologies, the importance of a display device which is a connection medium between a user and information increases. Accordingly, display devices such as a liquid crystal display device and an organic light emitting display device are increasingly used.

A display device displays a target image to a user by writing a data voltage for expressing a target gray scale in each pixel, and allowing an organic light emitting diode to emit light or allowing light of a backlight unit to be polarized by controlling orientation of liquid crystals, corresponding to the data voltage.

The display device may include a touch sensor for receiving a touch input by the user in addition to an image display function.

Also, the display device may include a pressure sensor for receiving a pressure of the touch input by the user.

Accordingly, the user can more conveniently use the display device through the touch sensor and the pressure sensor.

The above information disclosed in this Background section is only for understanding of the background of the inventive concepts, and, therefore, it may contain information that does not constitute prior art.

SUMMARY

According to one or more exemplary embodiments of the invention, a display device includes a touch sensor and a pressure sensor, which are formed through an improved manufacturing process.

Additional features of the inventive concepts will be set forth in the description which follows, and in part will be apparent from the description, or may be learned by practice of the inventive concepts.

According to an exemplary embodiment, a display device includes: a display panel including a display area on which an image is displayed and a non-display area surrounding the display area; an input sensor disposed on the display panel; and a pressure sensor configured to sense a pressure, wherein the input sensor includes a sensing base substrate extending in a first extending direction, the sensing base substrate including a first bending area bent from an outer edge of the sensing base substrate, wherein the pressure sensor is disposed on the first bending area of the sensing base substrate, and overlaps with the display area.

The input sensor may further include: a sensing circuit board extending in the first extending direction, the sensing circuit board being disposed on the first bending area; and a sensing driving circuit disposed on the sensing circuit board. The pressure sensor may be disposed on the sensing circuit board.

The sensing base substrate may further include a second bending area extending in a second extending direction different from the first extending direction, the second bending area being bent from another outer edge of the sensing base substrate. The input sensor may further include: a sensing circuit board extending in the second extending direction, the sensing circuit board being disposed on the second bending area; and a sensing driving circuit disposed on the sensing circuit board.

The second extending direction may be a direction opposite to the first extending direction.

The display device may further include: a window disposed on the input sensor, the window configured to protect the display panel and the input sensor; and a button formed at one side of the window.

The first extending direction may be a direction from the center of the display area extending to the button.

The sensing base substrate may further include an edge area extending in a third extending direction different from the first extending direction, the edge area being bent from a side outer edge.

The display device may further include an auxiliary pressure sensor disposed on the edge area of the sensing base substrate.

The third extending direction may be perpendicular to the first extending direction.

The pressure sensor may include: a first substrate; electrodes disposed on the first substrate, the electrodes being spaced apart from each other; and a pressure sensing layer disposed on the electrodes.

The pressure sensor may further include insulating members disposed on the first substrate, the insulating members being located between the electrodes.

The pressure sensor may further include: a second substrate disposed on the pressure sensing layer; and spacers disposed between the first substrate and the second substrate.

The pressure sensor may further include a conductive layer disposed between the pressure sensing layer and the electrodes.

The electrodes may partially overlap with the conductive layer.

The conductive layer may be an anisotropic conductive layer.

According to another exemplary embodiment, a display device includes: a display panel including a display area on which an image is displayed and a non-display area surrounding the display area; an input sensor directly disposed on the display panel; and a pressure sensor configured to sense a pressure, wherein the display panel includes a display base substrate extending in a first extending direction, the display base substrate including a first bending area bent from an outer edge of the sensing base substrate, wherein the pressure sensor is disposed on the first bending area of the display base substrate, and overlaps with the display area.

The display panel may further include: a display circuit board extending in the first extending direction, the display circuit board being disposed on the first bending area; and a display driving circuit disposed on the display circuit board. The pressure sensor may be disposed on the display circuit board.

The display base substrate may further include a second bending area extending in a second extending direction different from the first extending direction, the second bending area being bent from another outer edge of the sensing base substrate. The display panel may further include: a display circuit board extending in the second extending direction, the display circuit board being disposed on the second bending area; and a display driving circuit disposed on the display circuit board. The second extending direction may be a direction opposite to the first extending direction.

The display base substrate may further include an edge area extending in a third extending direction different from the first extending direction, the edge area being bent from a side outer edge of the sensing base substrate.

The display device may further include an auxiliary pressure sensor disposed on the edge area of the display base substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Exemplary embodiments will now be described more fully hereinafter with reference to the accompanying drawings; however, they may be embodied in different forms and should not be construed as limited to the exemplary embodiments set forth herein. Rather, these exemplary embodiments are provided so that this disclosure will be thorough and complete, and will fully convey the scope of the exemplary embodiments to those skilled in the art.

Figure 1A:
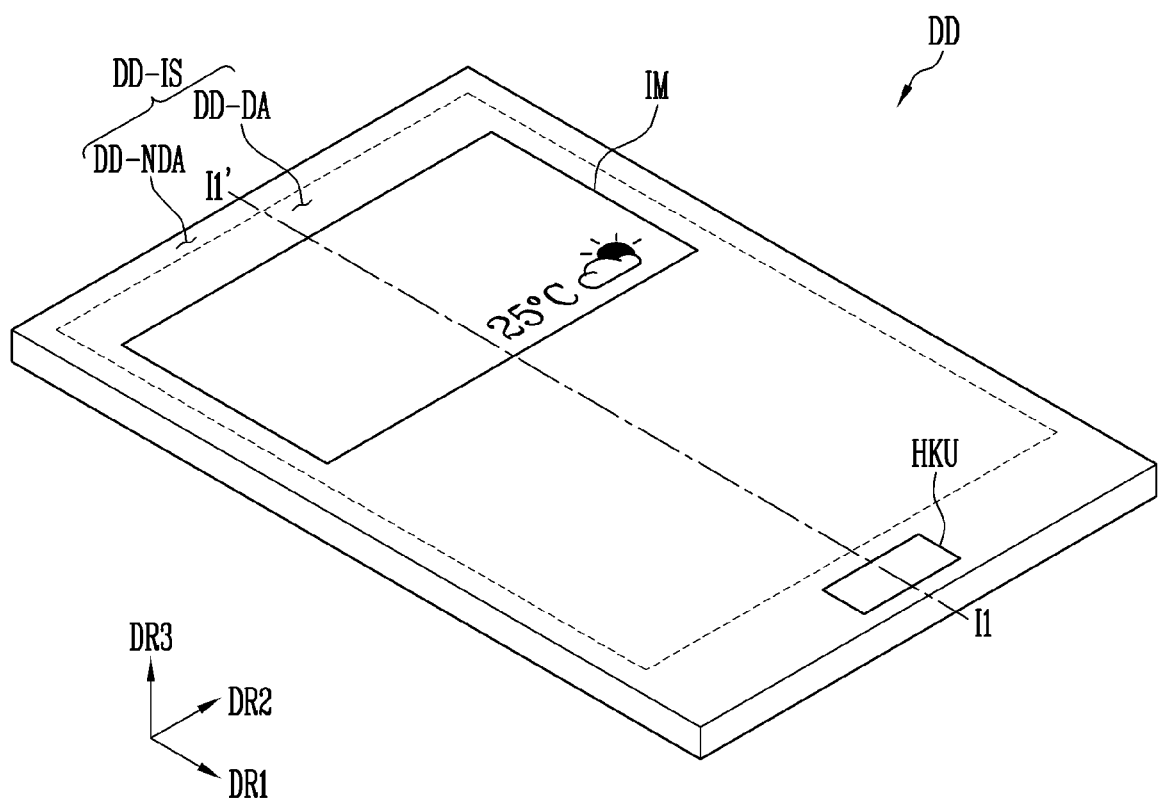

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Figure 1B:
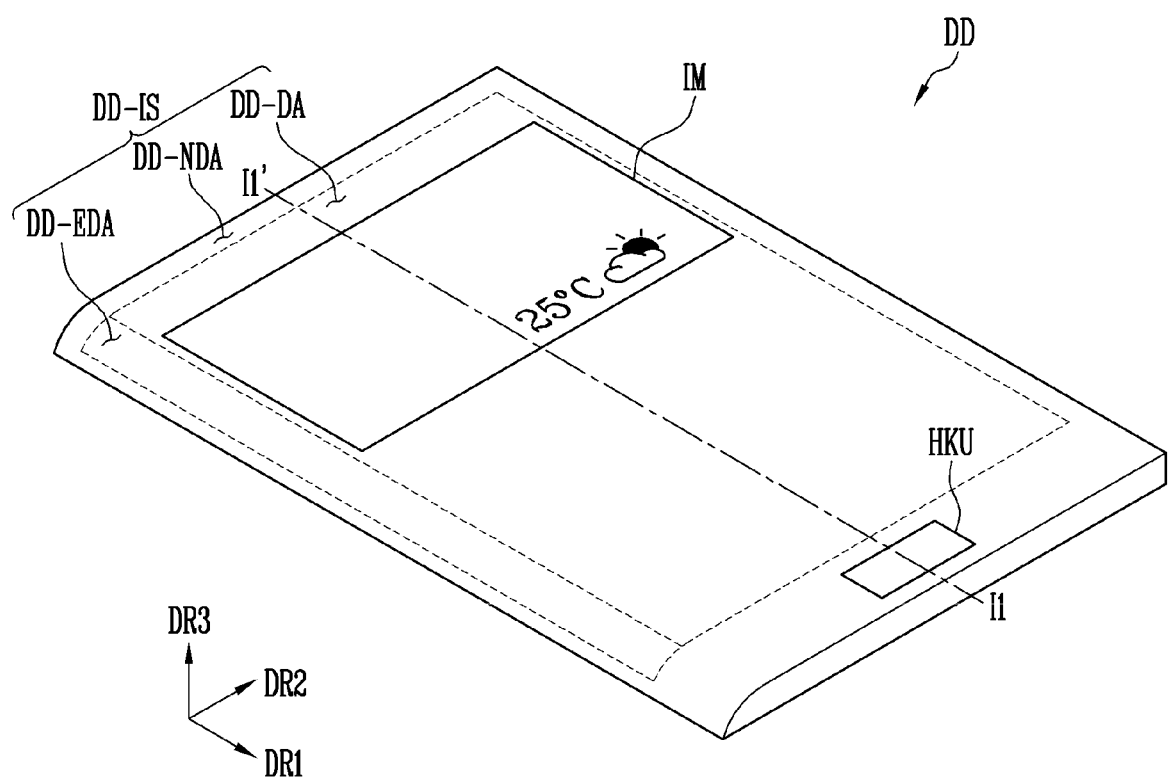

FIGS. 1A and 1B are views illustrating display devices according to exemplary embodiments of the present disclosure.

Figure 2A:
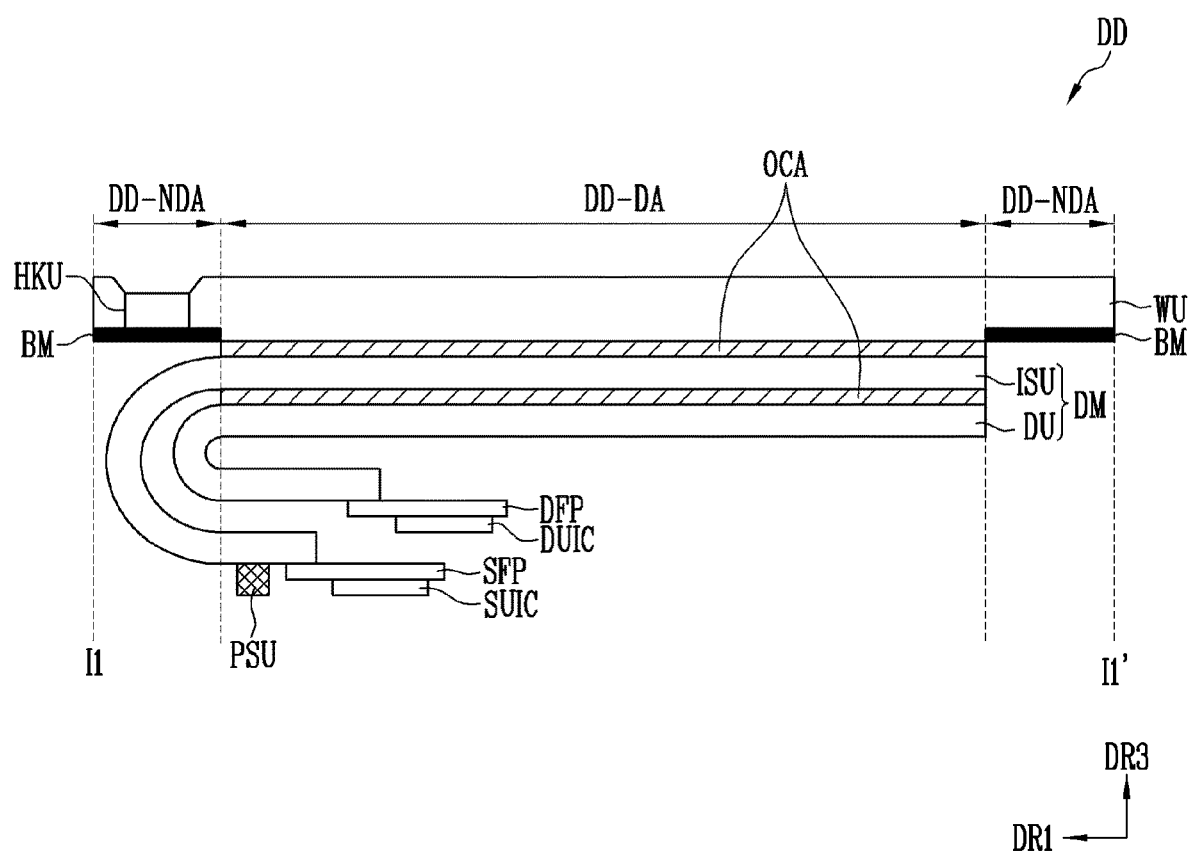
Figure 2B:
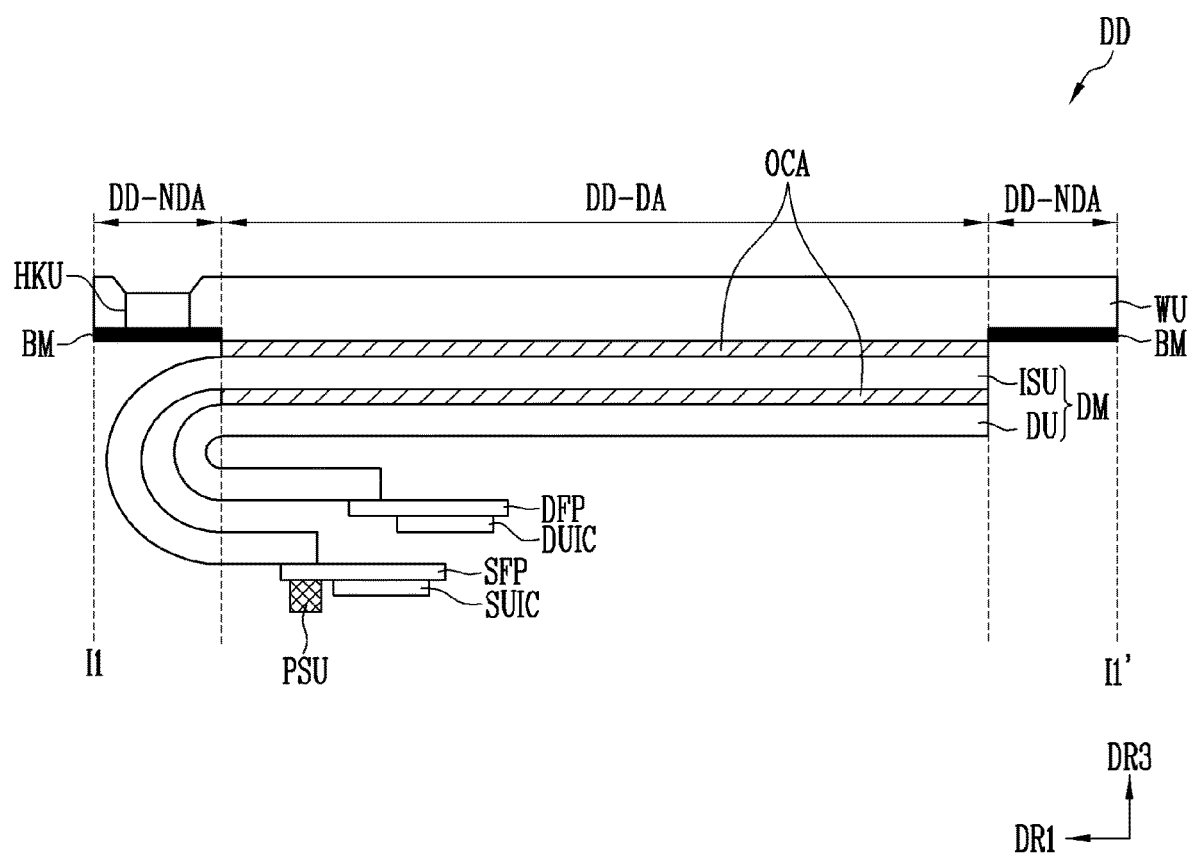
Figure 2C:
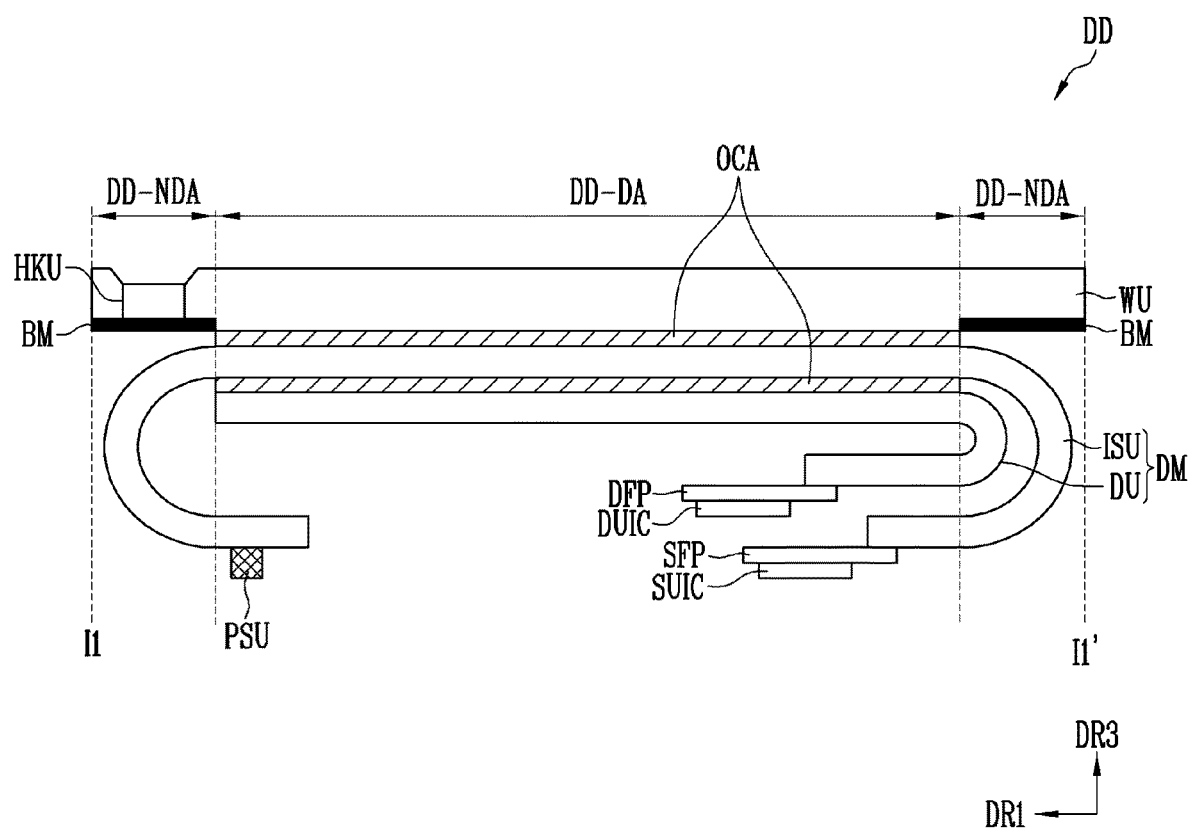

FIGS. 2A, 2B, and 2C are sectional views illustrating a section of a display device according to an exemplary embodiment.

Figure 3A:
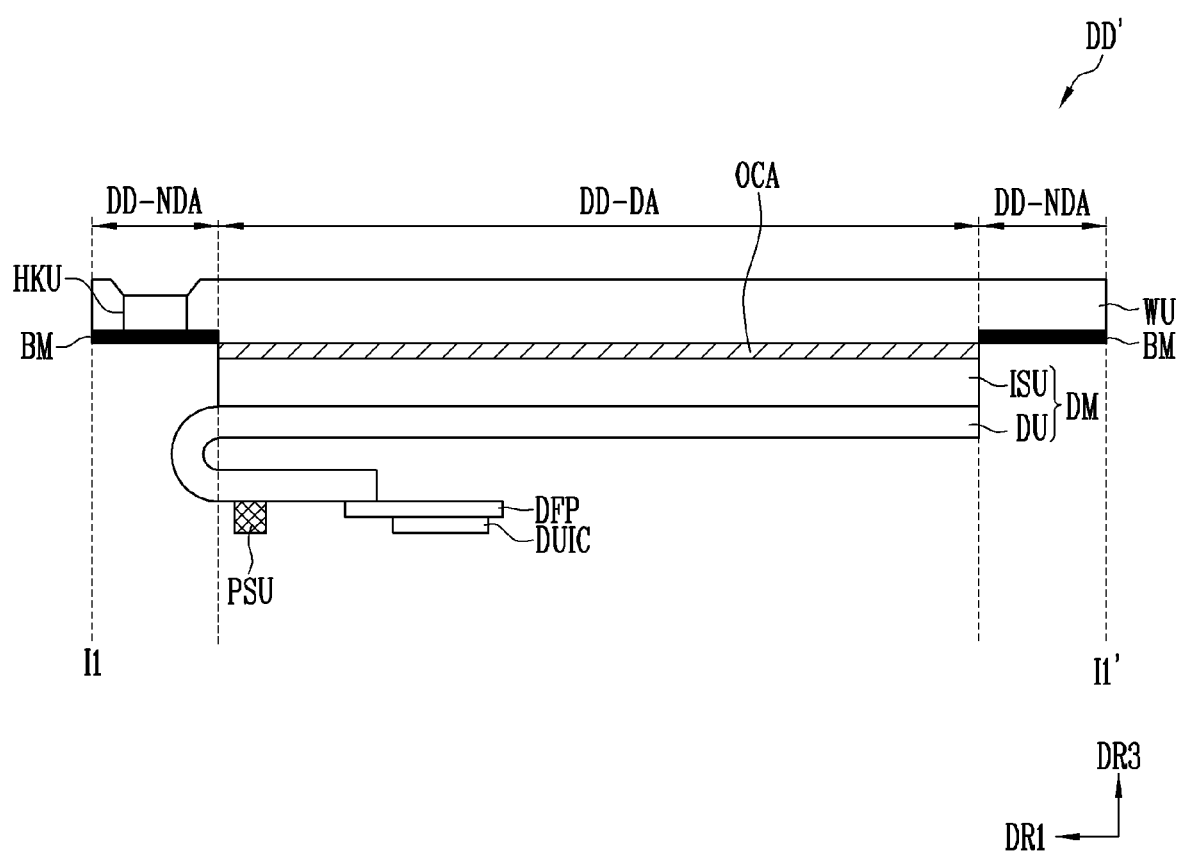
Figure 3B:
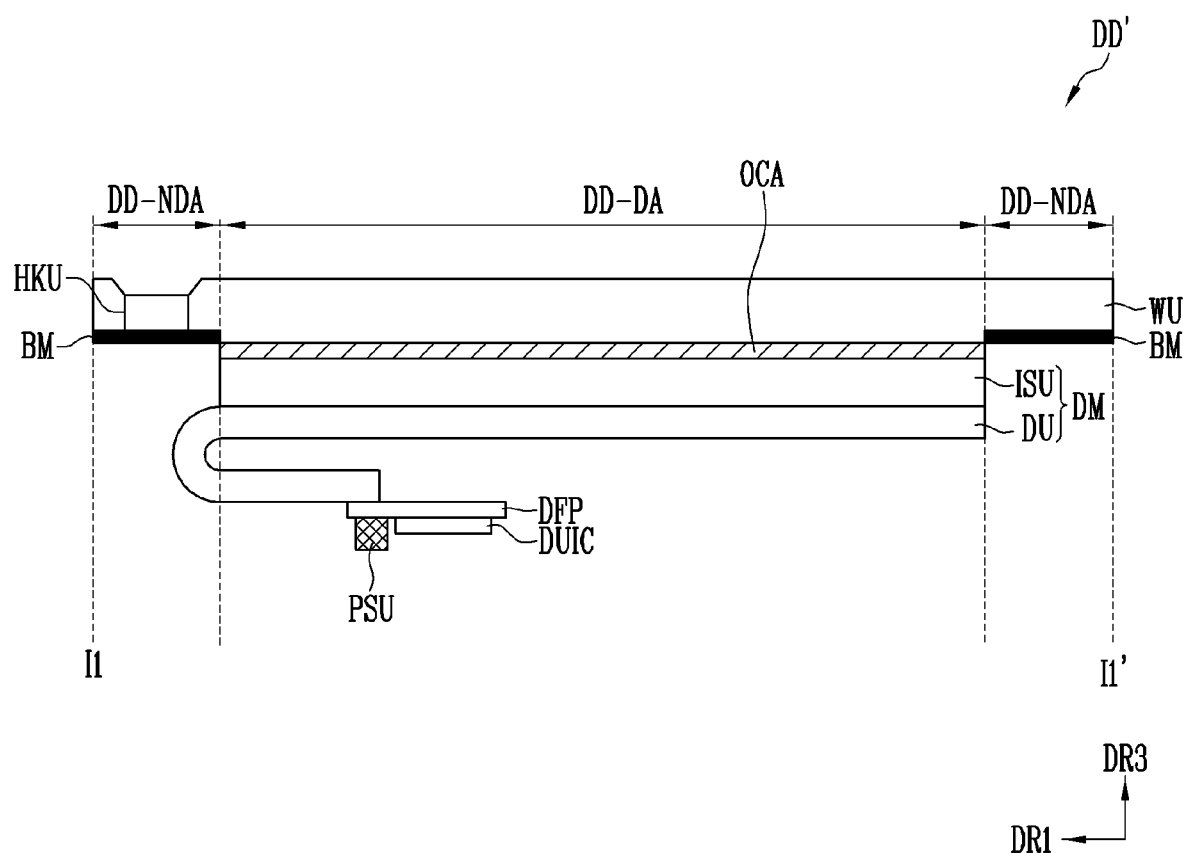
Figure 3C:
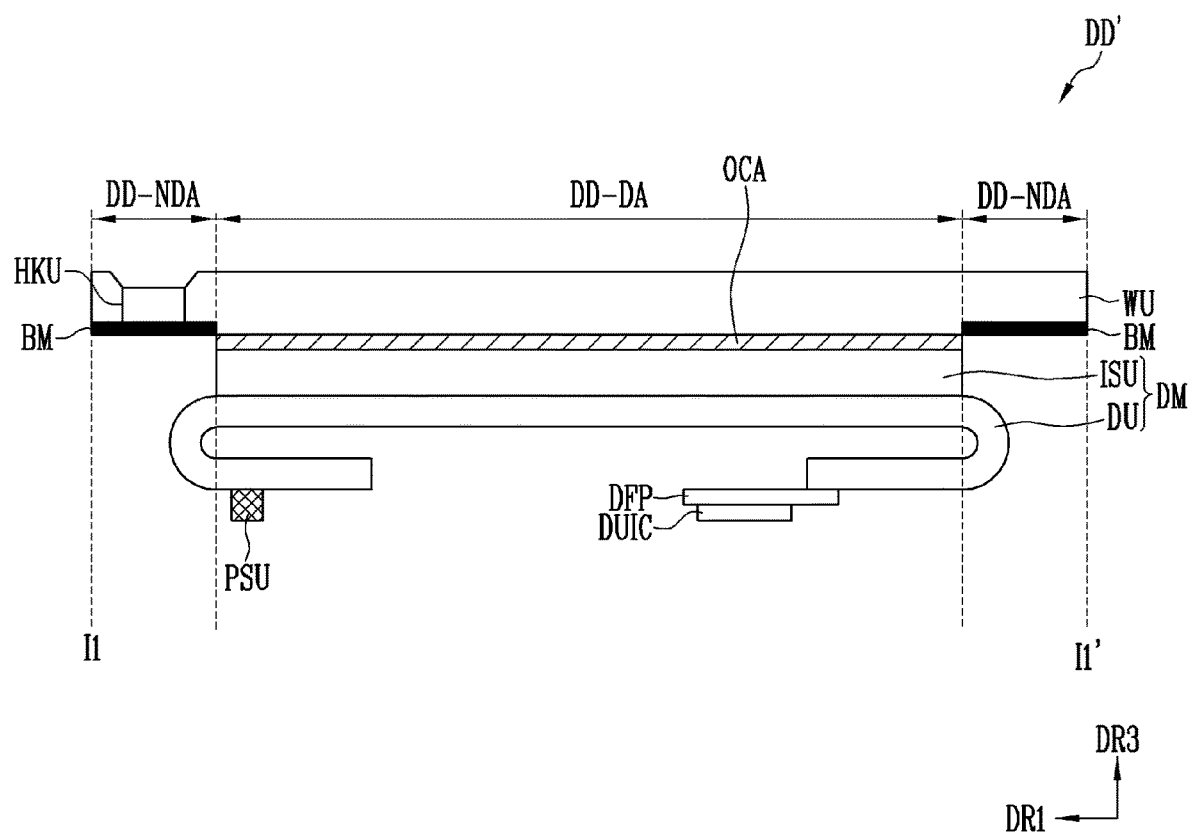

FIGS. 3A, 3B, and 3C are sectional views illustrating a section of a display device according to another exemplary embodiment.

Figure 4:
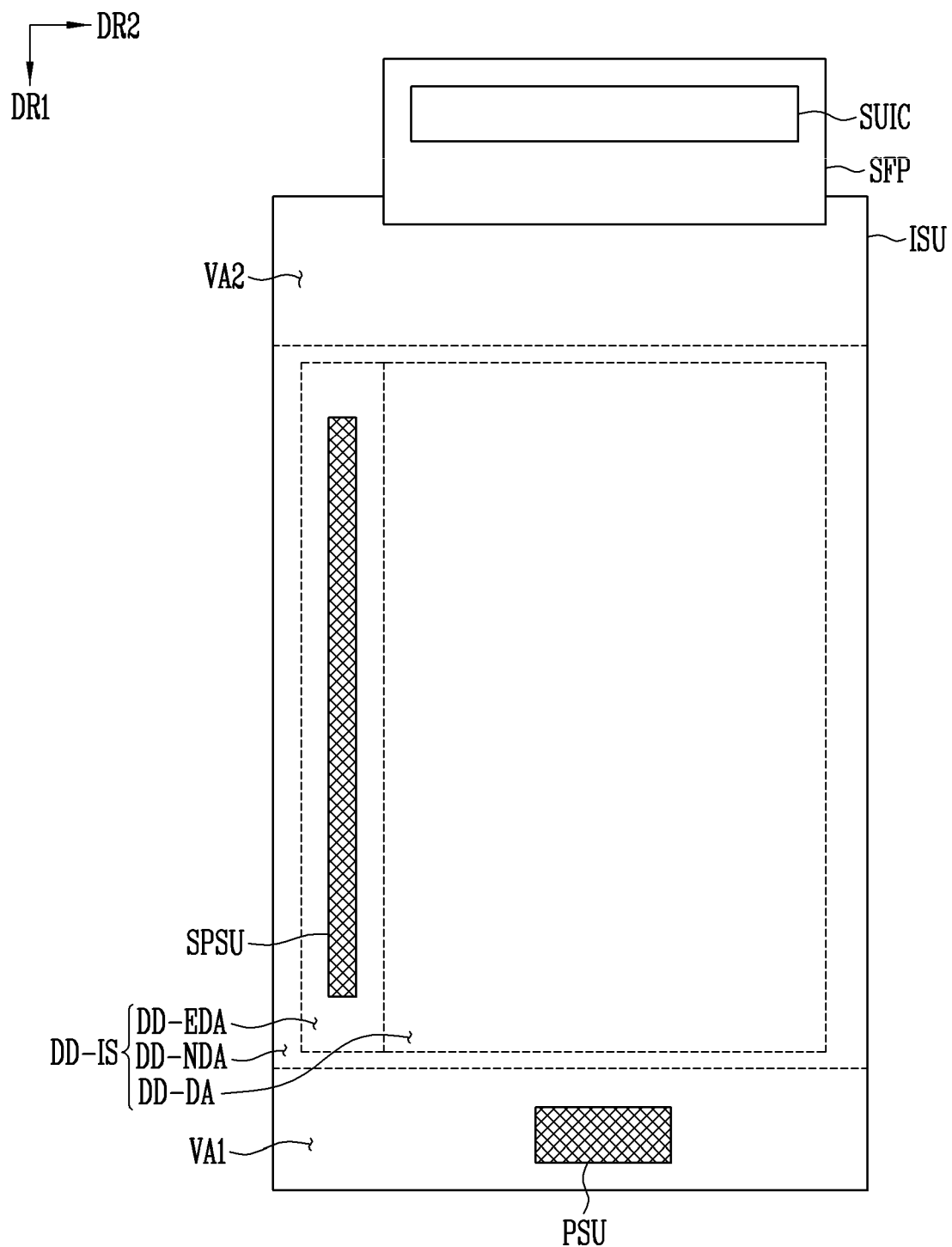

FIG. 4 is a plan view illustrating an arrangement of a pressure sensor and an auxiliary pressure sensor on an input sensor according to an exemplary embodiment.

Figure 5:
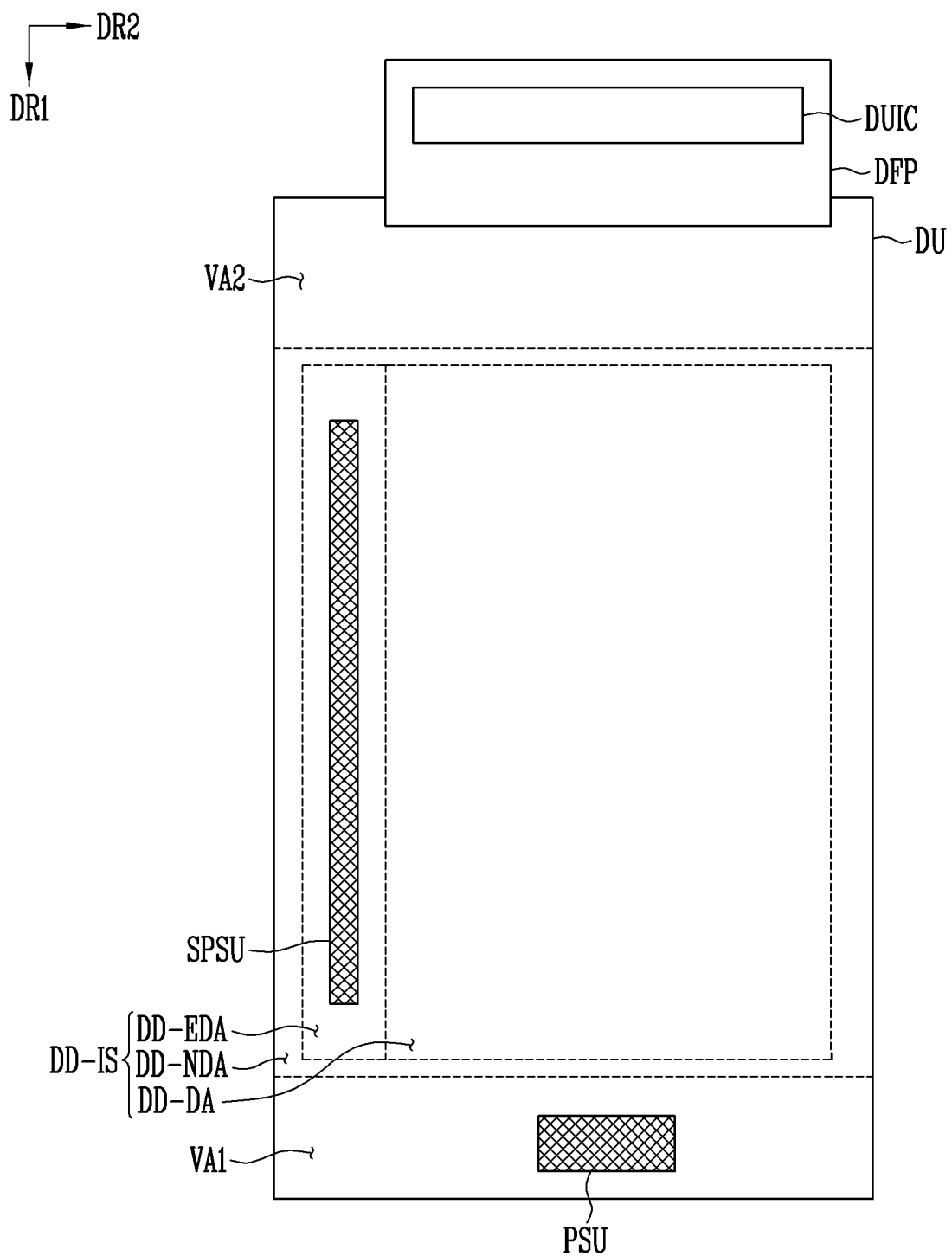

FIG. 5 is a plan view illustrating an arrangement of a pressure sensor and an auxiliary pressure sensor on a display panel according to an exemplary embodiment.

FIGS. 6A, 6B, 6C, 6D, and 6E are views illustrating sections of pressure sensors according to exemplary embodiments of the present disclosure.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1A is a view illustrating a display device DD according to an exemplary embodiment of the present disclosure.

Referring to FIG. 1A, a front surface of the display device DD may be defined as a display surface DD-IS, and the display device DD may display an image IM through the display surface DD-IS.

The display surface DD-IS is parallel to a surface defined by a first direction DR1 and a second direction DR2. A normal direction of the display surface DD-IS, i.e., a thickness direction of the display device DD with respect to the display surface DD-IS indicates a third direction DR3.

A front surface (or top surface) and a back surface (or bottom surface) of each component described in this specification is distinguished by the third direction DR3.

However, the first to third directions DR1, DR2, and DR3 illustrated in this exemplary embodiment are merely illustrative, and the directions indicated by the first to third directions DR1, DR2, and DR3 are relative concepts, and may be changed into other directions. Hereinafter, first to third directions are directions respectively indicated by the first to third directions DR1, DR2, and DR3, and are designated by like reference numerals.

Although FIG. 1A illustrates the display device DD including a planar display surface DD-IS, but the present disclosure is not limited thereto.

The display device DD may include a curved display surface DD-IS or a stereoscopic display surface DD-IS. The stereoscopic display surface DD-IS includes a plurality of display areas indicating different directions, and may include, for example, a polygonal pillar-shaped display surface.

In some exemplary embodiments, the display device DD a rigid display device or a flexible display device.

In FIG. 1A, the display device DD applicable to a mobile phone terminal is exemplarily illustrated. Although not shown in the drawing, electronic modules, a camera module, a power module, and the like, which are mounted on a main board, are disposed together with the display device DD in a bracket/case, etc., thereby constituting a mobile phone terminal.

Also, the display device DD according to the present disclosure may be applied to not only large-sized electronic devices such as televisions and monitors but also medium-/small-sized electronic devices such as tablet PCs, vehicle navigation systems, game consoles, and smart watches.

The display surface DD-IS of the display device DD may include a display area DD-DA and a non-display area DD-NDA.

The display area DD-DA is an area in which the image IM is displayed, and the non-display area DD-NDA is an area in which the image IM is not displayed. The non-display area DD-NDA may be an area adjacent to the display area DD-DA.

In FIGS. 1A and 1B, temperature and weather images are illustrated as an example of the image IM.

As shown in FIG. 1A, the display area DD-DA may have a quadrangular shape. The non-display area DD-NDA may surround the display area DD-DA. However, the present disclosure is not limited thereto, and the shape of the display area DD-DA and the shape of the non-display area DD-NDA may be relatively designed with respect to each other.

The display device DD may further include a button HKU.

Although FIG. 1A illustrates that the button HKU has a quadrangular shape, the present disclosure is not limited thereto. In some exemplary embodiments, the button HKU may be implemented in various shapes such as a triangular shape and a circular shape.

The button HKU may be disposed in the non-display area DD-NDA. However, the present disclosure is not limited thereto. In some exemplary embodiments, the button HKU may be disposed in the display area DD-DA.

FIG. 1B is a view illustrating a display device DD according to another exemplary embodiment of the present disclosure.

In the display device DD shown in FIG. 1B, descriptions of contents overlapping with those of the display device DD shown in FIG. 1A will be omitted to avoid redundancy.

A display surface DD-IS shown in FIG. 1B may further include an edge area DD-EDA, as compared with the display surface DD-IS shown in FIG. 1A.

For example, as shown in FIG. 1B, the edge area DD-EDA may be an area bent by a specific angle of 90 degrees or less with respect to the display are DD-DA.

Although FIG. 1B illustrates that the edge area DD-EDA is formed at one side of the display area DD-DA of the display device DD, the present disclosure is not limited thereto. In some exemplary embodiments, the edge area DD-EDA may be formed at both or more sides of the display area DD-DA of the display device DD.

Hereinafter, an exemplary embodiment in which the edge area DD-EDA is formed at one side of the display area DD-DA of the display device DD is representatively described for convenience of description.

In some exemplary embodiments, the edge area DD-EDA may be an area in which an image is displayed.

FIGS. 2A to 2C and 3A to 3C are sectional views illustrating sections taken along line I1-I1' of the display devices DD shown in FIGS. 1A and 1B.

Sections defined by the first direction DR1 and the third direction DR3 are illustrated in FIGS. 2A to 2C and 3A to 3C.

FIGS. 2A to 2C and 3A to 3C are simply illustrated to describe stacking relationships between functional panels and/or functional units, which constitute the display devices DD.

Referring to FIGS. 2A to 2C, the display device DD may include a display panel DU, an input sensor ISU, a button HKU, a pressure sensor PSU, and a window WU.

The display panel DU may generate the image IM (see FIGS. 1A and 1B).

In some exemplary embodiments, the display panel DU may be a luminescent display panel, but is not particularly limited. For example, the display panel DU may be an organic light emitting display panel or a quantum dot light emitting display panel. An emitting layer of the organic light emitting display panel may include an organic light emitting material. An emitting layer of the quantum dot light emitting display panel may include quantum dots, quantum rods, and the like. Hereinafter, the display panel DU is described as the organic light emitting display panel.

The display panel DU may include a display base substrate, a plurality of pixels disposed on the display base substrate, and a cover layer covering the pixels.

For convenience of description, the pixels and the cover layer are not shown in FIGS. 2A to 2C. Therefore, it will be understood that the display base substrate is substantially illustrated as the display panel DU shown in FIGS. 2A to 2C.

The display base substrate has flexibility, and may be bent from an outer edge as shown in FIGS. 2A to 2C.

In some exemplary embodiments, the pixels may be provided in the display area DD-DA.

The display panel DU may further include a display circuit board DFP and a display driving circuit DUIC.

The display circuit board DFP may connect the display panel DU and the display driving circuit DUIC to each other. In some exemplary embodiments, the display circuit board DFP may have flexibility.

The display driving circuit DUIC may drive the display panel DU. The display driving circuit DUIC may be disposed on the display circuit board DFP.

Referring to FIGS. 2A and 2B, the display base substrate may extend along a first extending direction (e.g., the first direction DR1).

The display circuit board DFP may be disposed on a first bending area of the display base substrate. Hereinafter, the first bending area of the display base substrate refers to an area that extends in the first extending direction and is bent from the outer edge to further extend along a second extending direction (e.g., the opposite direction of the first direction DR1). For example, at least a portion of the display circuit board DFP may overlap with the first bending area of the display base substrate.

Referring to FIG. 2C, the display base substrate may further extend in the second extending direction (e.g., the opposite direction of the first direction DR1) different from the first extending direction (e.g., the first direction DR1).

The display circuit board DFP may be disposed on a second bending area of the display base substrate. Hereinafter, the second bending area of the display base substrate refers to an area that extends in the second extending direction and bent from the outer edge to further extend along the first extending direction. For example, at least a portion of the display circuit board DFP may overlap with the second bending are of the display base substrate.

The input sensor ISU may be disposed on the display panel DU. For example, as shown in FIGS. 2A to 2C, the input sensor ISU may be coupled to the display panel DU through an adhesive member OCA. For example, the adhesive member OCA may include at least one of an adhesive, a gluing agent, and an optically transparent adhesive member.

The input sensor ISU may acquire coordinate information of an external input (e.g., a touch event).

In some exemplary embodiments, the input sensor ISU may be a touch sensor or pressure sensor, but is not particularly limited. Hereinafter, the input sensor ISU is described as the touch sensor.

The input sensor ISU may include a sensing base substrate, sensing electrodes disposed on the sensing base substrate, and a cover layer covering the sensing electrodes.

For convenience of description, the sensing electrodes and the cover layer are not shown in FIGS. 2A to 2C. Therefore, it will be understood that the sensing base substrate is substantially illustrated as the input sensor ISU shown in FIGS. 2A to 2C.

The sensing base substrate has flexibility, and may be bent along the outer edge as shown in FIGS. 2A to 2C.

In some exemplary embodiments, the sensing electrodes may be provided in the display area DD-DA.

The input sensor ISU may further include a sensing circuit board SFP and a sensing driving circuit SUIC.

The sensing circuit board SFP may connect the input sensor ISU and the sensing driving circuit SUIC to each other. In some exemplary embodiments, the sensing circuit board SFP may have flexibility.

The sensing driving circuit SUIC may drive the input sensor ISU. The sensing driving circuit SUIC may be disposed on the sensing circuit board SFP.

Referring to FIGS. 2A and 2B, the sensing base substrate may extend along the first extending direction (e.g., the first direction DR1).

The sensing circuit board SFP may be disposed on a first bending area of the sensing base substrate. That is, hereinafter, the first bending area of the sensing base substrate refers to an area that extends in the first extending direction and is bent from the outer edge to further extend along the second extending direction. For example, at least a portion of the sensing circuit board SFP may overlap with the first bending area of the sensing base substrate.

Referring to FIG. 2C, the sensing base substrate may further extend in the second extending direction (e.g., the opposite direction of the first direction DR1) different from the first extending direction (e.g., the first direction DR1).

The sensing circuit board SFP may be disposed on a second bending area of the sensing base substrate. Hereinafter, the second bending area of the sensing base substrate refers to an area that extends in the second extending direction and is bent from the outer edge to further extend along the first extending direction. For example, at least a portion of the sensing circuit board SFP may overlap with the second bending area of the sensing base substrate.

The pressure sensor PSU according to the exemplary embodiment of the present disclosure may sense a pressure. For example, the pressure sensor PSU may be driven by the sensing driving circuit SUIC. This will be described in detail with reference to FIGS. 6A to 6E.

When the first bending area of the sensing base substrate is bent along the outer edge, the pressure sensor PSU may overlap with the display area DD-DA on a plane parallel to the display surface DD-IS.

According to the exemplary embodiment shown in FIG. 2A, the pressure sensor PSU may be disposed on the first bending area of the sensing base substrate.

According to the exemplary embodiment shown in FIG. 2B, the pressure sensor PSU may be disposed on the sensing circuit board SFP.

According to the exemplary embodiment shown in FIG. 2C, the pressure sensor PSU may be disposed on the first bending area of the sensing base substrate.

A display module DM may include the display panel DU and the input sensor ISU.

Although not separately shown, the display module DM according to the exemplary embodiment of the present disclosure may further include a protective member disposed on a bottom surface of the display panel DU. The protective member and the display panel DU may be coupled to each other through an adhesive member.

The window WU may be disposed on the display module DM. For example, the window WU may be coupled to the display module DM through an adhesive member.

The window WU may protect the display module DM from the outside.

The window WU may include a light blocking pattern BM. The light blocking pattern BM may be disposed on a back surface of the window WU, to define a bezel area, i.e., the non-display area DD-NDA (see FIGS. 1A and 1B) of the display device DD.

The light blocking pattern BM is a colored organic layer, and may be formed using, for example, a coating technique.

The button HKU may be disposed at one side of the window WU. For example, the button HKU may be disposed in the non-display area DD-NDA (see FIGS. 1A and 1B) of the window part WU.

The button HKU may perform a home-key function of a mobile phone. For example, the first extending direction may mean a direction (e.g., the first direction DR1) facing the button HKU from the center of the display area DD-DA (see FIGS. 1A and 1B).

Referring to FIGS. 3A to 3C, the display device DD' may include a display panel DU, an input sensor ISU, a button HKU, a pressure sensor PSU, and a window WU.

In FIGS. 3A to 3C, descriptions of contents overlapping with those shown in FIGS. 2A to 2C will be omitted to avoid redundancy.

The display panel DU may generate the image IM (see FIGS. 1A and 1B).

The display panel DU may include a display base substrate, a plurality of pixels disposed on the display base substrate, and a cover layer covering the pixels.

For convenience of description, the pixels and the cover layer are not shown in FIGS. 3A to 3C. Therefore, it will be understood that the display base substrate is substantially illustrated as the display panel DU shown in FIGS. 3A to 3C.

The display base substrate has flexibility, and may be bent along the outer edge as shown in FIGS. 3A to 3C.

In some exemplary embodiments, the pixels may be provided in the display area DD-DA.

The display panel DU may further include a display circuit board DFP and a display driving circuit DUIC.

The display circuit board DFP may connect the display panel DU and the input sensor ISU to the display driving circuit DUIC. In some exemplary embodiments, the display circuit board DFP may have flexibility.

The display driving circuit DUIC may drive the display panel DU and the input sensor ISU. The display driving circuit DUIC may be disposed on the display circuit board DFP.

That is, unlike the exemplary embodiments shown in FIGS. 2A to 2C, the display driving circuit DUIC may be integrated with the sensing driving circuit SUIC in the exemplary embodiments shown in FIGS. 3A to 3C.

Referring to FIGS. 3A and 3B, the display base substrate may extend along the first extending direction (e.g., the first direction DR1).

The display circuit board DFP may be disposed on a first bending area of the display base substrate. For example, at least a portion of the display circuit board DFP may overlap with the first bending area of the display base substrate.

Referring to FIG. 3C, the display base substrate may further extend in the second extending direction (e.g., the opposite direction of the first direction DR1) different from the first extending direction (e.g., the first direction DR1).

The display circuit board DFP may be disposed on a second bending area of the display base substrate. For example, at least a portion of the display circuit board DFP may overlap with the second bending area of the display base substrate.

In this specification, "component A is directly disposed on component A" means that there is no separate adhesive layer/adhesive member disposed between the component A and the component B. The component B is formed on a base surface provided by the component A through a continuous process after the component A is formed.

The input sensor ISU may be directly disposed on the display panel DU. For example, the input sensor ISU may be formed on a base surface provided by the display panel DU through a continuous process.

The input sensor ISU may include sensing electrodes directly disposed on the base surface provided by the display panel DU (i.e., the cover layer of the display panel DU) and a cover layer covering the sensing electrodes.

It will be understood that the sensing electrodes and the cover layer are substantially illustrated as the input sensor ISU shown in FIGS. 3A to 3C.

In some exemplary embodiments, the sensing electrodes may be provided in the display area DD-DA.

The pressure sensor PSU may sense a pressure. For example, the pressure sensor PSU may be driven by the display driving circuit DUIC. This will be described in detail with reference to FIGS. 6A to 6E.

When the first bending area of the display based substrate is bent along the outer edge, the pressure sensor PSU may overlap with the display area DD-DA. That is, the pressure sensor PSU may overlap with the display area DD-DA on a plane parallel to the display surface DD-IS.

According to the exemplary embodiment shown in FIG. 3A, the pressure sensor PSU may be disposed on the first bending area of the display base substrate.

According to the exemplary embodiment shown in FIG. 3B, the pressure sensor PSU may be disposed on the display circuit board DFP.

According to the exemplary embodiment shown in FIG. 3C, the pressure sensor PSU may be disposed on the first bending area of the display base substrate.

FIG. 4 is a plan view illustrating an arrangement of a pressure sensor PSU and an auxiliary pressure sensor SPSU on an input sensor ISU according to an exemplary embodiment of the present disclosure.

FIG. 4 schematically shows the display device DD which is not yet bent. FIG. 4 exemplarily illustrates an input sensor ISU included in a display device DD having the edge area DD-EDA shown in FIG. 1B and the stacking structure shown in FIG. 2C. However, the present disclosure is not limited thereto, and the arrangement of the pressure sensor PSU and the auxiliary pressure sensor SPSU, which are shown in FIG. 4, may be applied to the display device DD shown in FIGS. 2A and 2B.

The input sensor ISU may include a sensing base substrate, sensing electrodes disposed on the sensing base substrate, and a cover layer covering the sensing electrodes.

For convenience of description, the sensing electrodes and the cover layer are not shown in FIG. 4. Therefore, it will be understood that the sensing base substrate is substantially illustrated as the input sensor ISU shown in FIG. 4. The input sensor ISU that is not bent is illustrated in FIG. 4.

The input sensor ISU may further include a sensing circuit board SFP and a sensing driving circuit SUIC.

The sensing circuit board SFP may connect the input sensor ISU and the sensing driving circuit SUIC to each other. In some exemplary embodiments, the sensing circuit board SFP may have flexibility.

The sensing driving circuit SUIC may drive the input sensor ISU. The sensing driving circuit SUIC may be disposed on the sensing circuit board SFP.

The pressure sensor PSU and the auxiliary pressure sensor SPSU may sense a pressure. For example, the pressure sensor PSU and the auxiliary pressure sensor SPSU may be driven by the sensing driving circuit SUIC.

Referring to FIG. 4, the sensing base substrate may extend along a first extending direction (e.g., the first direction DR1), a second extending direction (e.g., the opposite direction of the first direction DR1), and a third extending direction (e.g., the opposite direction of the second direction DR2).

The sensing base substrate may include a display area DD-DA, a non-display area DD-NDA, a first bending area VA1 extending in the first extending direction, a second bending area VA2 extending in the second extending direction, and an edge area DD-EDA extending in the third extending direction.

The sensing electrodes may be provided in the display area DD-DA and the edge area DD-EDA.

The pressure sensor PSU may be provided on the first bending area VA1 of the sensing base substrate.

The sensing circuit board SFP may be disposed on the second bending area VA2 of the sensing base substrate. For example, at least a portion of the sensing circuit board SFP may overlap with the second bending area VA2 of the sensing base substrate.

The auxiliary pressure sensor SPSU may be disposed on the edge area DD-EDA of the sensing base substrate.

FIG. 5 is a plan view illustrating an arrangement of a pressure sensor PSU and an auxiliary pressure sensor SPSU on a display panel DU according to an exemplary embodiment of the present disclosure.

FIG. 5 exemplarily illustrates a display panel DU included in a display device DD' having the edge area DD-EDA shown in FIG. 1B and the stacking structure shown in FIG. 3C. However, the present disclosure is not limited thereto, and the arrangement of the pressure sensor PSU and the auxiliary pressure sensor SPSU, which are shown in FIG. 5, may be applied to the display device DD' shown in FIGS. 3A and 3B.

The display panel DU may include a display base substrate, a plurality of pixels disposed on the display base substrate, and a cover layer covering the pixels.

For convenience of description, the pixels and the cover layer are not shown in FIG. 5. Therefore, it will be understood that the display base substrate is substantially illustrated as the display panel DU shown in FIG. 5. The display panel DU that is not bent is illustrated in FIG. 5.

The display panel DU may further include a display circuit board DFP and a display driving circuit DUIC.

The display circuit board DFP may connect the display unit DU and the input sensor ISU to the display driving circuit DUIC. In some exemplary embodiments, the display circuit board DFP may have flexibility.

The display driving circuit DUIC may drive the display panel DU and the input sensor ISU. The display driving circuit DUIC may be disposed on the display circuit board DFP.

The pressure sensor PSU and the auxiliary pressure sensor SPSU may sense a pressure. For example, the pressure sensor PSU and the auxiliary pressure sensor SPSU may be driven by the display driving circuit DUIC.

Referring to FIG. 5, the display base substrate may extend along a first extending direction (e.g., the first direction DR1), a second extending direction (e.g., the opposite direction of the first direction DR1), and a third extending direction (e.g., the opposite direction of the second direction DR2).

The display base substrate may include a display area DD-DA, a non-display area DD-NDA, a first bending area VA1 extending in the first extending direction, a second bending area VA2 extending in the second extending direction, and an edge area DD-EDA extending in the third extending direction.

The pixels may be provided in the display area DD-DA and the edge area DD-EDA.

The pressure sensor PSU may be provided on the first bending area VA1 of the display base substrate.

The display circuit board DFP may be disposed on the second bending area VA2 of the display base substrate. For example, at least a portion of the display circuit board DFP may overlap with the second bending area VA2 of the display base substrate.

The auxiliary pressure sensor SPSU may be disposed on the edge area DD-EDA of the display base substrate.

In some exemplary embodiments, at least one of the pressure sensor PSU and the auxiliary pressure sensor SPSU may be directly disposed on the display panel DU. That is, at least one of the pressure sensor PSU and the auxiliary pressure sensor SPSU may be disposed on the cover layer of the display panel DU.

FIGS. 6A to 6E are views illustrating sections of pressure sensors according to exemplary embodiments of the present disclosure.

The auxiliary pressure sensors SPSU shown in FIGS. 4 and 5 may have the same structure as the pressure sensors PSU. Therefore, the following structures may be applied to the auxiliary pressure sensors SPSU.

Figure 6A:
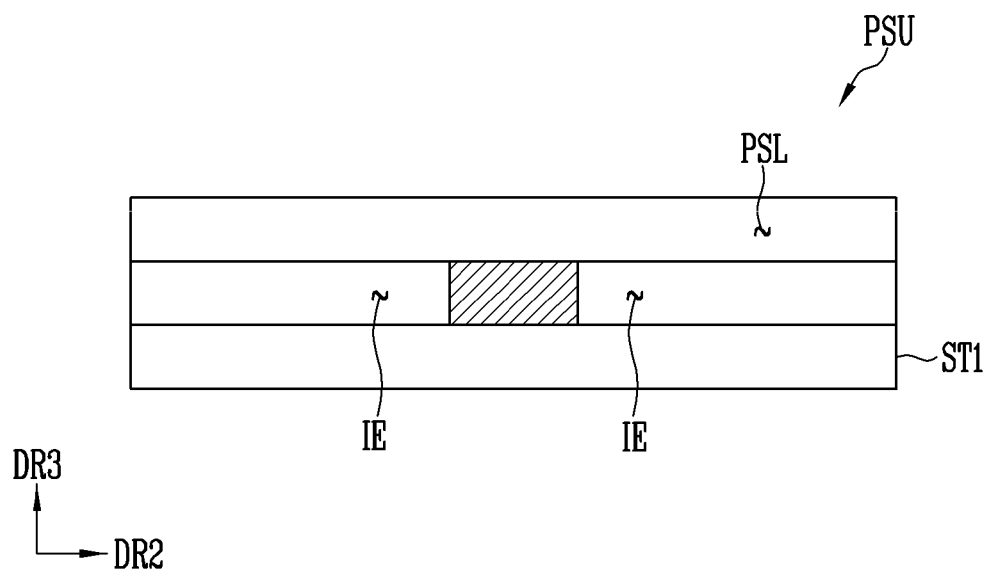

Referring to FIG. 6A, the pressure sensor PSU may include a first substrate ST1, electrodes IE, and a pressure sensing layer PSL.

The first substrate ST1 may be a substrate that provides a base surface on which other components of the pressure sensor PSU are to be provided. In some exemplary embodiments, the first substrate ST1 may mean a separate substrate, the sensing base substrate of the input sensor ISU shown in FIGS. 2A to 2C, or the display base substrate of the display panel DU shown in FIGS. 3A to 3C.

In some exemplary embodiments, the first substrate ST1 may be a glass substrate, a metal substrate, or an organic/inorganic complex material substrate.

The electrodes IE may be disposed on the first substrate ST1. For example, the electrodes IE may be disposed to be spaced apart from each other. Shading areas of FIGS. 6A to 6E mean spaces. In some exemplary embodiments, the spaces may be filled with air, an insulating material, etc.

The pressure sensing layer PSL may be disposed on the electrodes IE. The pressure sensing layer PSL may have elasticity. For example, the pressure sensing layer PSL may have an electrical resistance value, and the resistance value may be changed depending on the magnitude of a pressure applied to the pressure sensing layer PSL. The pressure sensor PSU may sense a pressure or a magnitude of the pressure by sensing a change in the resistance value of the pressure sensing layer PSL through the electrodes IE and the pressure sensing layer PSL.

Figure 6B:
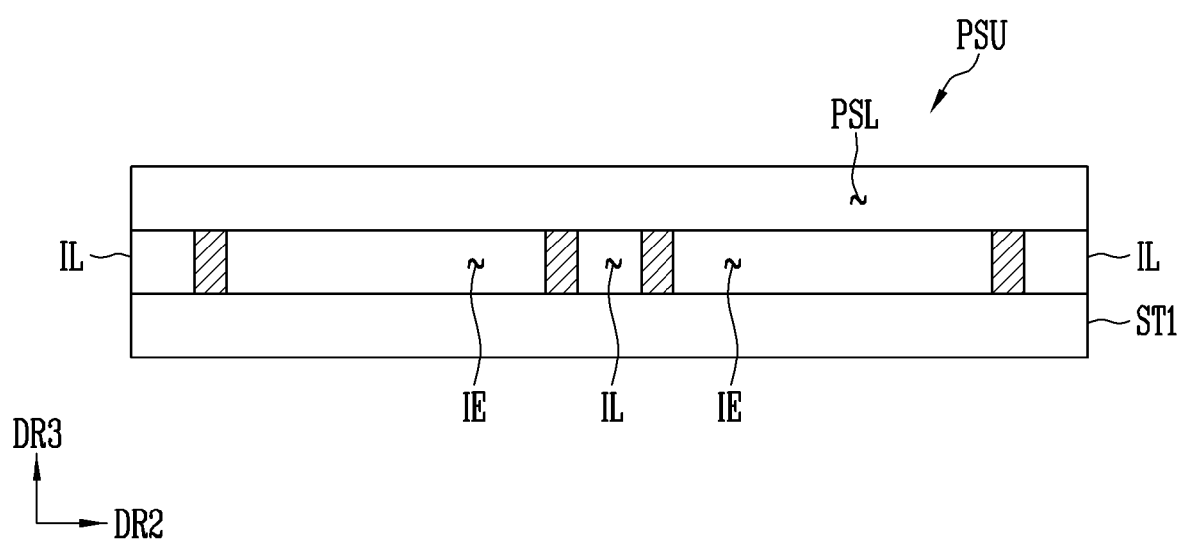

Referring to FIG. 6B, the pressure sensor PSU may include a first substrate ST1, electrodes IE, insulating members IL, and a pressure sensing layer PSL.

In the pressure sensor PSU shown in FIG. 6B, descriptions of contents overlapping with those of the pressure sensor PSU shown in FIG. 6A will be omitted to avoid redundancy.

The insulating members IL may be disposed on the first substrate ST1. The insulating members IL may be located between the electrodes IE.

The insulating members IL may include an inorganic material, an organic material, or a complex material.

The inorganic material may include at least one of aluminum oxide, titanium oxide, silicon oxide, silicon oxynitride, zirconium oxide, and hafnium oxide.

The organic material may include at least one of acryl-based resin, methacryl-based resin, polyisoprene, vinyl-based resin, epoxy-based resin, urethane-based resin, cellulose-based resin, siloxane-based resin, polyimide-based resin, polyamide-based resin, and perylene-based resin.

Figure 6C:
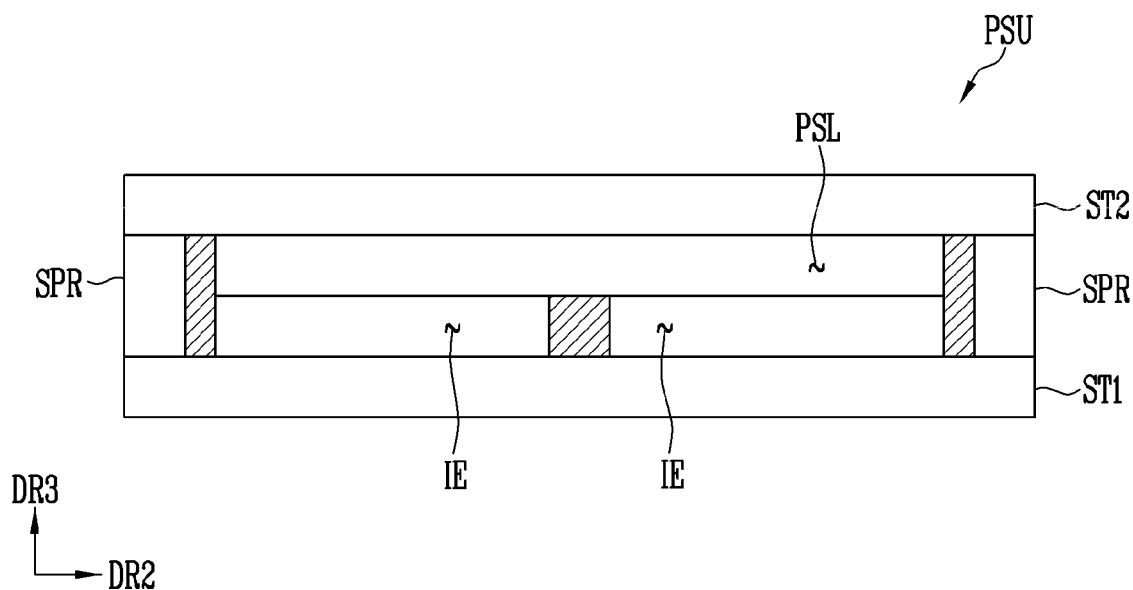

Referring to FIG. 6C, the pressure sensor PSU may include a first substrate ST1, electrodes IE, a pressure sensing layer PSL, a second substrate ST2, and spacers SPR.

In the pressure sensor PSU shown in FIG. 6C, descriptions of contents overlapping with those of the pressure sensor PSU shown in FIG. 6A will be omitted to avoid redundancy.

The second substrate ST2 may be a substrate for protecting the electrodes IE, the pressure sensing layer PSL, and the like from the outside. The second substrate ST2 may be disposed on the pressure sensing layer PSL. In some exemplary embodiments, the second substrate ST2 may be a glass substrate, a metal substrate, or an organic/inorganic complex material substrate.

The spacers SPR may be disposed between the first substrate ST1 and the second substrate ST2. For example, the spacers SPR may be provided to keep a space of the electrodes IE and the pressure sensing layer PSL. The spacers SPR may include an inorganic material, an organic material, or a complex material.

Figure 6D:
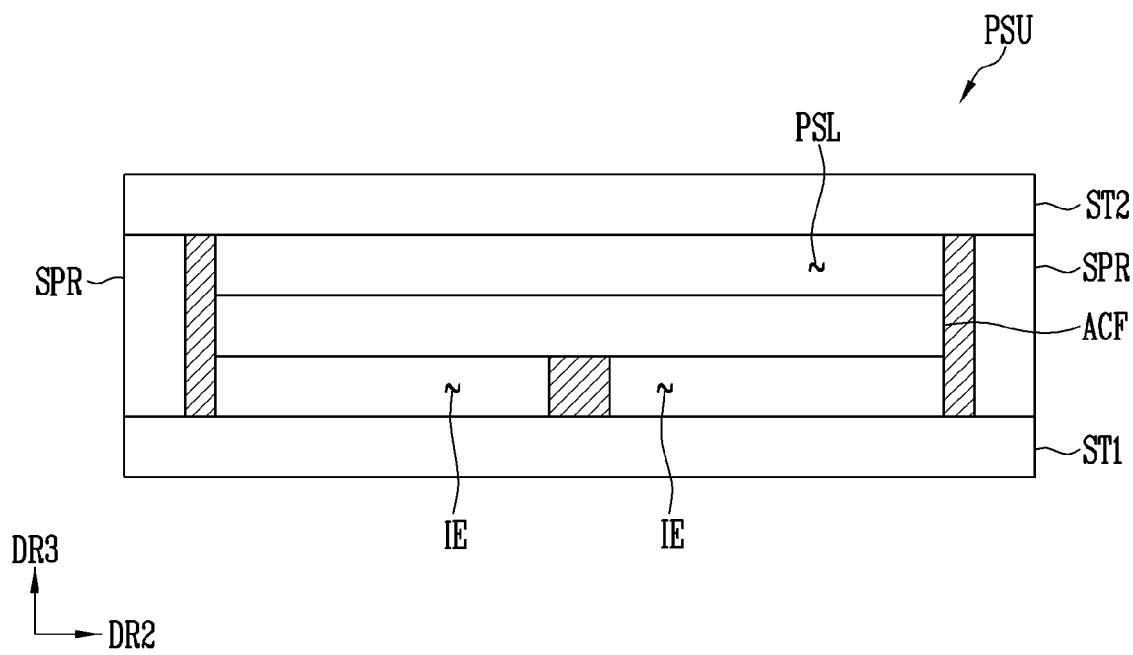

Referring to FIG. 6D, the pressure sensor PSU may include a first substrate ST1, electrodes IE, a conductive layer ACF, a pressure sensing layer PSL, a second substrate ST2, and spacers SPR.

In the pressure sensor PSU shown in FIG. 6D, descriptions of contents overlapping with those of the pressure sensor PSU shown in FIG. 6C will be omitted to avoid redundancy.

The conductive layer ACF may electrically connect the electrodes IE and the pressure sensing layer PSL. The conductive layer ACF may be disposed between the electrodes IE and the pressure sensing layer PSL.

In some exemplary embodiments, the pressure sensing layer PSL may entirely overlap with the conductive layer ACF, and the electrodes IE may entirely overlap with the conductive layer ACF.

The conductive layer ACF may include a metal layer and a transparent conductive layer.

The metal layer may include molybdenum, silver, titanium, copper, aluminum, and alloys thereof.

The transparent conductive layer may include a transparent conductive oxide such as indium tin oxide (ITO), indium zinc oxide (IZO), zinc oxide (ZnO), or indium tin zinc oxide (ITZO). In addition, the transparent conductive layer may include conductive polymer such as PEDOT, metal nano wire, graphene, etc.

In some exemplary embodiments, the conductive layer ACF may be an anisotropic conductive film.

Figure 6E:
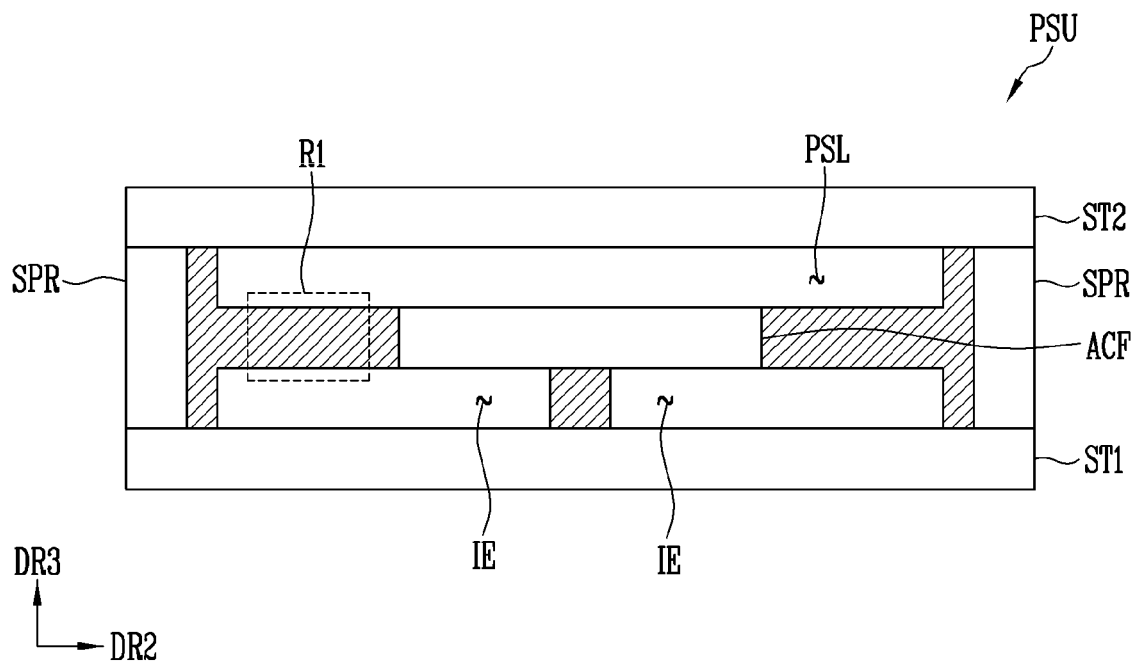

Referring to FIG. 6E, the pressure sensor PSU may include a first substrate ST1, electrodes IE, a conductive layer ACF, a pressure sensing layer PSL, a second substrate ST2, and spacers SPR.

In the pressure sensor PSU shown in FIG. 6E, descriptions of contents overlapping with those of the pressure sensor PSU shown in FIG. 6D will be omitted to avoid redundancy.

Unlike the pressure sensor PSU shown in FIG. 6D, the pressure sensing layer PSL of the pressure sensor PSU shown in FIG. 6E may partially overlap with the conductive layer ACF, and the electrodes IE may partially overlap with the conductive layer ACF.

That is, a first region R1 may be provided between the conductive layer ACF and the pressure sensing layer PSL. The first region R1 might be a space.

For example, each of the first region R1 and the pressure sensing layer PSL may have an electrical resistance value, and the resistance value may be changed depending on the magnitude of a pressure applied to each of the first region R1 and the pressure sensing layer PSL. The pressure sensor PSU may sense a pressure or a magnitude of the pressure by sensing a change in the resistance values of the first region R1 and the pressure sensing layer PSL through the electrodes IE and the pressure sensing layer PSL.

In the display device according to the present disclosure, a manufacturing process of a pressure sensor is performed after a manufacturing process of a touch sensor. Thus, the manufacturing cost of the display device can be reduced, and the thickness of the display device can be decreased.

Further, in the display device according to the present disclosure, the touch sensor and the pressure sensor are formed in the same layer, so that a separate attachment process can be omitted. Thus, the yield of display device can be improved.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular exemplary embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the present disclosure as set forth in the following claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel comprising a display area on which an image is displayed and a non-display area surrounding the display area;
an input sensor disposed on the display panel; and
a pressure sensor configured to sense a pressure,
wherein the input sensor comprises a sensing base substrate extending in a first extending direction, the sensing base substrate further comprising a first surface coupled to the display panel in the display area, a second surface opposite the first surface, and a first bending area bent from an outer edge of the sensing base substrate,
wherein the pressure sensor is disposed on the second surface of the sensing base substrate in the first bending area, and overlaps with the display area.

2. The display device of claim 1, wherein the input sensor further comprises:
a sensing circuit board extending in the first extending direction, the sensing circuit board being disposed on the first bending area; and
a sensing driving circuit disposed on the sensing circuit board,
wherein the pressure sensor is disposed on the sensing circuit board.

3. The display device of claim 1, wherein the sensing base substrate further comprises a second bending area extending in a second extending direction different from the first extending direction, the second bending area being bent from another outer edge of the sensing base substrate,
wherein the input sensor further comprises:
a sensing circuit board extending in the second extending direction, the sensing circuit board being disposed on the second bending area; and
a sensing driving circuit disposed on the sensing circuit board.

4. The display device of claim 3, wherein the second extending direction is a direction opposite to the first extending direction.

5. The display device of claim 1, further comprising:
a window disposed on the input sensor, the window configured to protect the display panel and the input sensor; and
a button formed at one side of the window.

6. The display device of claim 5, wherein the first extending direction is a direction from a center of the display area extending to the button.

7. The display device of claim 1, wherein the sensing base substrate further comprises an edge area extending in a third extending direction different from the first extending direction, the edge area being bent from a side outer edge of the sensing base substrate.

8. The display device of claim 7, further comprising an auxiliary pressure sensor disposed on the edge area of the sensing base substrate.

9. The display device of claim 7, wherein the third extending direction is perpendicular to the first extending direction.

10. The display device of claim 1, wherein the pressure sensor comprises:
a first substrate;
electrodes disposed on the first substrate, the electrodes being spaced apart from each other; and
a pressure sensing layer disposed on the electrodes.

11. The display device of claim 10, wherein the pressure sensor further comprises insulating members disposed on the first substrate, the insulating members being located between the electrodes.

12. The display device of claim 10, wherein the pressure sensor further comprises:
a second substrate disposed on the pressure sensing layer; and
spacers disposed between the first substrate and the second substrate.

13. The display device of claim 12, wherein the pressure sensor further comprises a conductive layer disposed between the pressure sensing layer and the electrodes.

14. The display device of claim 13, wherein the electrodes partially overlap with the conductive layer.

15. The display device of claim 13, wherein the conductive layer is an anisotropic conductive layer.

16. A display device comprising:
a display panel comprising a display area on which an image is displayed and a non-display area surrounding the display area;
an input sensor directly disposed on the display panel; and
a pressure sensor configured to sense a pressure,
wherein the display panel comprises a display base substrate extending in a first extending direction, the display base substrate comprising a first surface coupled to the input sensor in the display area and a first bending area bent from an outer edge of the input sensor,
wherein the pressure sensor is disposed on the first surface of the display base substrate in the first bending area, and overlaps with the display area.

17. The display device of claim 16, wherein the display base substrate further comprises a second bending area extending in a second extending direction different from the first extending direction, the second bending area being bent from another outer edge of the input sensor,
wherein the display panel further comprises:
a display circuit board extending in the second extending direction, the display circuit board being disposed on the second bending area; and
a display driving circuit disposed on the display circuit board,
wherein the second extending direction is a direction opposite to the first extending direction.

18. The display device of claim 16, wherein the display base substrate further comprises an edge area extending in a third extending direction different from the first extending direction, the edge area being bent from a side outer edge of the input sensor.

19. The display device of claim 18, further comprising an auxiliary pressure sensor disposed on the edge area of the display base substrate.

20. A display device comprising:
a display panel comprising a display area on which an image is displayed and a non-display area surrounding the display area,
an input sensor directly disposed on the display panel; and
a pressure sensor configured to sense a pressure,
wherein the display panel comprises a display base substrate extending in a first extending direction, the display base substrate comprising a first surface contacting the input sensor in the display area and a first bending area bent from an outer edge of the input sensor,
wherein the pressure sensor is disposed on the first surface of the display base substrate in the first bending area, and overlaps with the display area.

21. The display device of claim 20, wherein the display base substrate further comprises a second bending area extending in a second extending direction different from the first extending direction, the second bending area being bent from another outer edge of the input sensor,
wherein the display panel further comprises:
a display circuit board extending in the second extending direction, the display circuit board being disposed on the second bending area; and
a display driving circuit disposed on the display circuit board,
wherein the second extending direction is a direction opposite to the first extending direction.

22. The display device of claim 20, wherein the display base substrate further comprises an edge area extending in a third extending direction different from the first extending direction, the edge area being bent from a side outer edge of the input sensor.

23. The display device of claim 22, further comprising an auxiliary pressure sensor disposed on the edge area of the display base substrate.

\* \* \* \* \*